US009800677B2

(12) United States Patent
Wood

(10) Patent No.: US 9,800,677 B2
(45) Date of Patent: *Oct. 24, 2017

(54) METHOD AND APPARATUS FOR RECLASSIFYING E-MAIL OR MODIFYING A SPAM FILTER BASED ON USERS' INPUT

(71) Applicant: AT&T Intellectual Property I, L.P., Atlanta, GA (US)

(72) Inventor: Stephen Wood, Whitehouse Station, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/507,251

(22) Filed: Oct. 6, 2014

(65) Prior Publication Data
US 2015/0026804 A1 Jan. 22, 2015

Related U.S. Application Data

(63) Continuation of application No. 12/333,711, filed on Dec. 12, 2008, now Pat. No. 8,886,728.

(51) Int. Cl.
G06F 15/16 (2006.01)
H04L 29/08 (2006.01)
G06Q 10/10 (2012.01)
H04L 12/58 (2006.01)
H04L 29/06 (2006.01)

(52) U.S. Cl.
CPC .......... H04L 67/22 (2013.01); G06Q 10/107 (2013.01); H04L 51/12 (2013.01); H04L 51/22 (2013.01); H04L 63/1408 (2013.01); H04L 63/1441 (2013.01)

(58) Field of Classification Search
USPC ................. 709/206, 203, 202, 223, 224
See application file for complete search history.

(56) References Cited

U.S. PATENT DOCUMENTS

| 7,219,148 B2 | 5/2007 | Rounthwaite et al. | |
| 8,819,142 B1* | 8/2014 | Golub | H04L 51/12 709/206 |
| 2004/0003283 A1* | 1/2004 | Goodman | G06Q 10/107 726/30 |
| 2004/0083270 A1* | 4/2004 | Heckerman | H04L 51/12 709/207 |
| 2004/0215977 A1 | 10/2004 | Goodman et al. | |
| 2005/0080856 A1* | 4/2005 | Kirsch | H04L 12/58 709/206 |
| 2005/0198159 A1* | 9/2005 | Kirsch | H04L 51/12 709/206 |

(Continued)

Primary Examiner — Lan-Dai T Truong
(74) Attorney, Agent, or Firm — Scott P. Zimmerman, PLLC

(57) ABSTRACT

A method is disclosed including passing a plurality of e-mails through a spam filter and classifying at least of the plurality of e-mails as not spam. Thereafter, the plurality of e-mails are received at each of a plurality of user computers. The method may further include receiving a plurality of reports, the plurality of reports including one report from each of the plurality of user computers that one or more of the plurality of e-mails are spam that was not classified as spam by the spam filter. Based on the plurality of reports, one or more of the plurality of e-mails is reclassified as spam and/or the spam filter is modified.

19 Claims, 6 Drawing Sheets

(56) References Cited

U.S. PATENT DOCUMENTS

| | | | |
|---|---|---|---|
| 2006/0129644 A1* | 6/2006 | Owen | G06Q 10/107 |
| | | | 709/206 |
| 2006/0168024 A1 | 7/2006 | Mehr et al. | |
| 2006/0277259 A1 | 12/2006 | Murphy et al. | |
| 2006/0277264 A1* | 12/2006 | Rainisto | H04L 51/12 |
| | | | 709/206 |
| 2009/0037469 A1* | 2/2009 | Kirsch | G06Q 10/107 |
| 2009/0216841 A1 | 8/2009 | Choi et al. | |
| 2010/0082758 A1* | 4/2010 | Golan | G06Q 10/107 |
| | | | 709/206 |
| 2015/0213131 A1* | 7/2015 | Styler | H04L 61/1511 |
| | | | 707/767 |

\* cited by examiner

METHOD AND APPARATUS FOR RECLASSIFYING E-MAIL OR MODIFYING A SPAM FILTER BASED ON USERS' INPUT

CROSS REFERENCE TO RELATED APPLICATION

This application is a continuation of U.S. patent application Ser. No. 12/333,711 filed Dec. 12, 2008 and since issued as U.S. Pat. No. 8,886,728, the disclosure of which is herein incorporated by reference in its entirety.

FIELD

The disclosed technology relates to electronic mail (e-mail) and more particularly to the classification and/or filtering of e-mail as spam or not spam.

BACKGROUND

Spam is generally defined as unwanted and unsolicited e-mail. Each day thousands of e-mail systems, such as Simple Mail Transfer Protocol (SMTP) mail systems, controlled by spammers, connect or attempt to connect to mail servers of large Internet Service Providers (ISPs) to transmit spam. The Internet Service providers may attempt to block e-mail from an Internet Protocol domain or address that is recognized as a spammer and is on a known blacklist. In addition, the Internet Service providers typically have spam filters, which attempt to eliminate or at least reduce, the amount of spam which gets through to user computers, or which is unintentionally classified as not spam.

Internet Service Providers first focus their efforts on either obtaining spam filtering rules from a vendor or developing their own from analysis of spam messages. Secondly, ISPs either obtain a spam Internet Protocol blacklist from a vendor, or they compile their own by analyzing "verdict results", arriving at a reputation for each mail system or IP address sender and establishing thresholds to be used to determine whether a particular mail system's IP address should be added to their blacklist. "Verdict results" are determinations of whether an e-mail message is classified as spam or not spam by a spam filter. Internet Service Providers (ISPs) generally analyze all verdict results for all e-mail originating from a sending IP address to determine a reputation for that sending IP Address.

More specifically, the operation of the blocking and filtering process is as follows. When an originating mail system or IP address sender attempts to transmit email to a destination mail system, the originating IP address is first checked against a whitelist and then against a blacklist. If the IP address is on the whitelist, the connection and associated messages are accepted. Whitelists are compiled by analyzing historical data to identify trusted mail systems, by including mail system IP lists supplied by trusted companies, and by analyzing blocking complaints to identify trusted mail system. If a connection is accepted, the e-mail message is passed to a filtering process or spam filter to determine if it is spam. If the message is determined to be spam by the spam filter, then the message is either quarantined or deleted. If the message is determined not to be spam, the message is sent to the recipient's post office inbox on a mail server. E-mail that is identified as spam by a mail server of an Internet Service provider may be placed in a user's post office spam folder. A user can download e-mail from either a user's post office inbox or from a user's post office spam folder onto the user's computer or client computer.

If the originating IP address is on a blacklist, the connection and associated messages are rejected. An error is returned on rejected connections and, in many cases a non-delivery notice is sent back to the originator of a rejected message.

A problem with such prior solutions is that spammers can easily send spam that gets past the blacklists and spam filters. They send spam from a vast number of different IP addresses that have no reputation or at least not a bad reputation. They modify their spam messages as often as they need in order to get a sufficient amount of spam through the filters. They test their spam messages prior to initiating an attack to insure it is sufficient. As a result, ISPs are constantly updating their blacklists and their filtering rules after the fact with the hope that it may mitigate the next attack. Sometimes it takes hours to days to be able to identify and create new filters to catch the new spam and as a result most of the spam from a specific attack may get past the filters. It is delivered to the ISP's post office, waiting to be requested by the user to be either read by an online email client or delivered to their personal computer email client.

The effectiveness of the current filtering process is limited because it is very hard to mitigate attacks by simply filtering spam messages after the fact. Spammers easily change or randomize the content of the spam messages to by-pass even the best spam filters. Additionally, spammers can execute test spam attacks to determine whether their spam messages for a specific spam attack will get past the filtering defenses. Even if a high percent of the spam gets filtered out, the spammers will increase their volume until they get a sufficient amount of spam through the filters.

As a result of not being able to identify sufficient spam to meet thresholds that ISPs have set up to block malicious mail systems, many ISPs lower their blocking thresholds, which lowers their confidence with their blocking decisions. This can cause an increase in the blocking of legitimate mail systems or IP address senders and an increase in complaints to their care centers.

Over the last several years, a larger and larger proportion of the spam that is sent by spammers is getting by Internet Service Providers' defenses, and being delivered into user's post office inbox. It has gotten to the point where sometimes close to 100% of all spam received during a specific spam attack from a spammer is getting through the ISP's defenses. It is common for large ISPs to receive five hundred million spam messages each day, transmitted from tens of millions of unique Internet Protocol (IP) addresses, many of which have never before connected to the Internet Service Provider.

As a result of being unsure of the sender's identity, the lack of reputation, the ever increasing difficulty with ascertaining whether a message is spam, and the increasing effectiveness of spammers, ISPs have had a hard time improving the effectiveness of their current spam blocking and filtering processes. As a consequence, spam is increasingly being delivered to the ISP subscribers' post office inboxes and has significantly and adversely affected their experience with using e-mail. In addition, from an ISP's perspective, it has greatly affected the cost of providing service.

Spammers need to get their spam past the ISP blocking and spam filtering defenses and into many users' post office inboxes in order for users to consider purchasing their products. To obtain maximum selling potential, spammers have to send spam to millions of user's email addresses on a vast number of ISPs. Spam that has gotten past blocking and filtering defenses and deposited in a user's post office inbox is commonly called "missed spam".

There are various devices known in the prior art for filtering e-mail and/or classifying e-mail as either spam or not spam. U.S. Pat. No. 7,219,148 to Routhwaite et. al. discloses a feedback loop for spam prevention. Users, known as "spam fighters" receive unfiltered e-mail messages and identify them as either spam or not spam. The feedback from the "spam fighters" is used to train improved spam filters.

SUMMARY

One embodiment of the disclosed technology involves transmitting an email, classified at a spam filter as not-spam-email, to each of a plurality of user computers; receiving at least one report from at least one of the plurality of user computers that the not-spam-email is spam; and based at least on the report, reclassifying the not-spam-email as spam.

In another embodiment of the disclosed technology, a plurality of e-mails are passed through a spam filter on a mail server and classified by the spam filter as not spam. The plurality of e-mails are transmitted to each of a plurality of user computers after the plurality of e-mails have passed through the spam filter. The plurality of user computers may supply a plurality of reports to the mail server indicating that one or more of the plurality of e-mails are "missed spam", i.e. spam that was not classified as spam by the spam filter. Based on the plurality of user reports, one or more of the plurality of e-mails is reclassified as spam. Alternatively or additionally, the spam filter may be modified to ensure that future e-mails will be classified as spam, if they are identical to or substantially similar to the "missed spam".

The disclosed technology, in at least one embodiment, takes advantage of collaborative inputs from any number of users, such as potentially millions of users. The input from the users can be used to determine whether current e-mail is spam and to determine whether a specific Internet Protocol address sender should be identified as a spammer. In one embodiment, e-mail that has arrived at a user's post office inbox and has been classified as not spam, but has not been delivered to a user's mailbox, can be reclassified as spam.

The step of classifying each of the plurality of e-mails as not spam may include placing each of the plurality of e-mails in a user's post office inbox. The step of reclassifying the one or more of the plurality of e-mails as spam may include moving the one or more of the plurality of e-mails from a user's post office inbox to a user's post office spam folder.

After the plurality of e-mails have passed through the spam filter and have been classified as not spam, a first set of information may be stored on a mail system to indicate that the one or more of the plurality of e-mails are not classified as spam. After receiving the plurality of reports, a second set of information may be stored on the mail system to indicate that the one or more of the plurality of e-mails are classified as spam, and the first set of information may be deleted. One or more acknowledgement messages may be sent from a mail server to one or more user or client computers of the plurality of user computers, wherein each of the acknowledgement messages provide information concerning the reclassifying of the one or more of the plurality of e-mails as spam.

The spam filter may be located on a mail server computer, the classifying of each of the plurality of e-mails as not spam may occur on the mail server computer, the plurality of reports may be received by the mail server computer, and the reclassifying of the one or more of the plurality of e-mails as spam may occur on a mail server computer. The server computer may be a mail system.

Each of the plurality of e-mails may have a message header. In accordance with an embodiment of the disclosed technology an originating Internet Protocol address, a recipient e-mail address, and a message identification may be inserted into the message header to form a modified message header, prior to passing the plurality of e-mails through the spam filter. The modified message headers may be stored in a message database on the mail server computer.

After reclassifying the one or more of the plurality of e-mails as spam, an entry may be stored in a users' reputation database to indicate that a user has correctly reported spam that was not classified correctly by the spam filter.

The method may also include modifying the spam filter, based on the plurality of reports from the plurality of user computers, so that when the plurality of e-mails are passed through the spam filter, the plurality of e-mails will be classified as spam.

DETAILED DESCRIPTION

Figure 1:
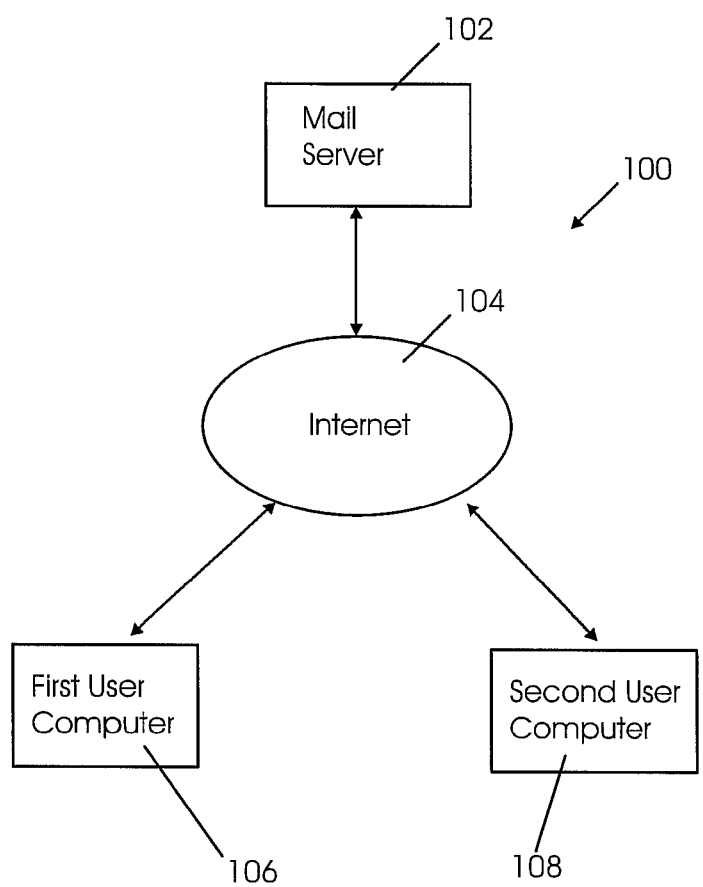
FIG. 1 shows a diagram of an apparatus for use in accordance with an embodiment of the disclosed technology.

FIG. 1 shows a diagram of an apparatus and/or system 100 for use in accordance with an embodiment of the disclosed technology. The apparatus 100 includes a mail server 102, the internet 104, a first user or client computer 106, and a second user or client computer 108. The mail server 102, the first user computer 106, and the second user computer 108 may be connected by communications links to the internet 104. The communications links may be any type of communications links such as wireless, wired, optical, etc. Although only two user computers 106 and 108 are shown in FIG. 1, in practice many more user computers, such as millions of user computers, would be connected to the internet 104, and would be used in accordance with one or more embodiments of the disclosed technology.

Figure 6:
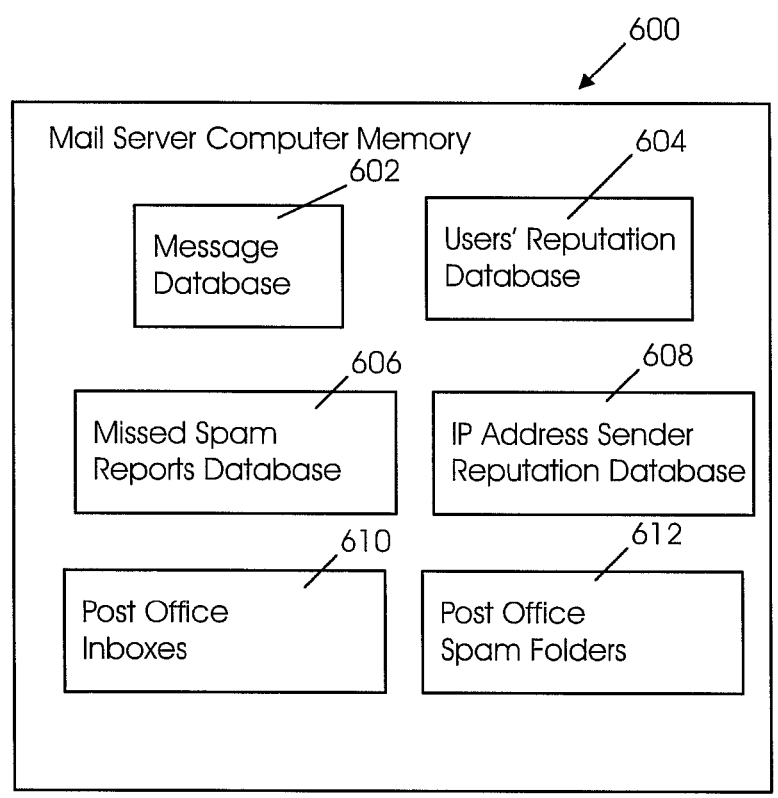
FIG. 6 shows a block diagram of various databases which may be part of computer memory of a mail server in accordance with an embodiment of the disclosed technology.

The mail server 102 may include a computer memory, such as mail server computer memory 600 shown in a block diagram of FIG. 6. The mail server computer memory 600 may include a message database 602 for storing e-mails or e-mail messages, a users' reputation database 604 for storing data related to users' reputations for correctly identifying "missed spam", a missed spam reports database 606 for storing reports of "missed spam", and an IP address sender reputation database 608 for storing data relating to the reputations of particular IP address senders of e-mail. The mail server computer memory 600 may also include post office inboxes 610 for all users and post office spam folders 612 for all users.

Figure 2:
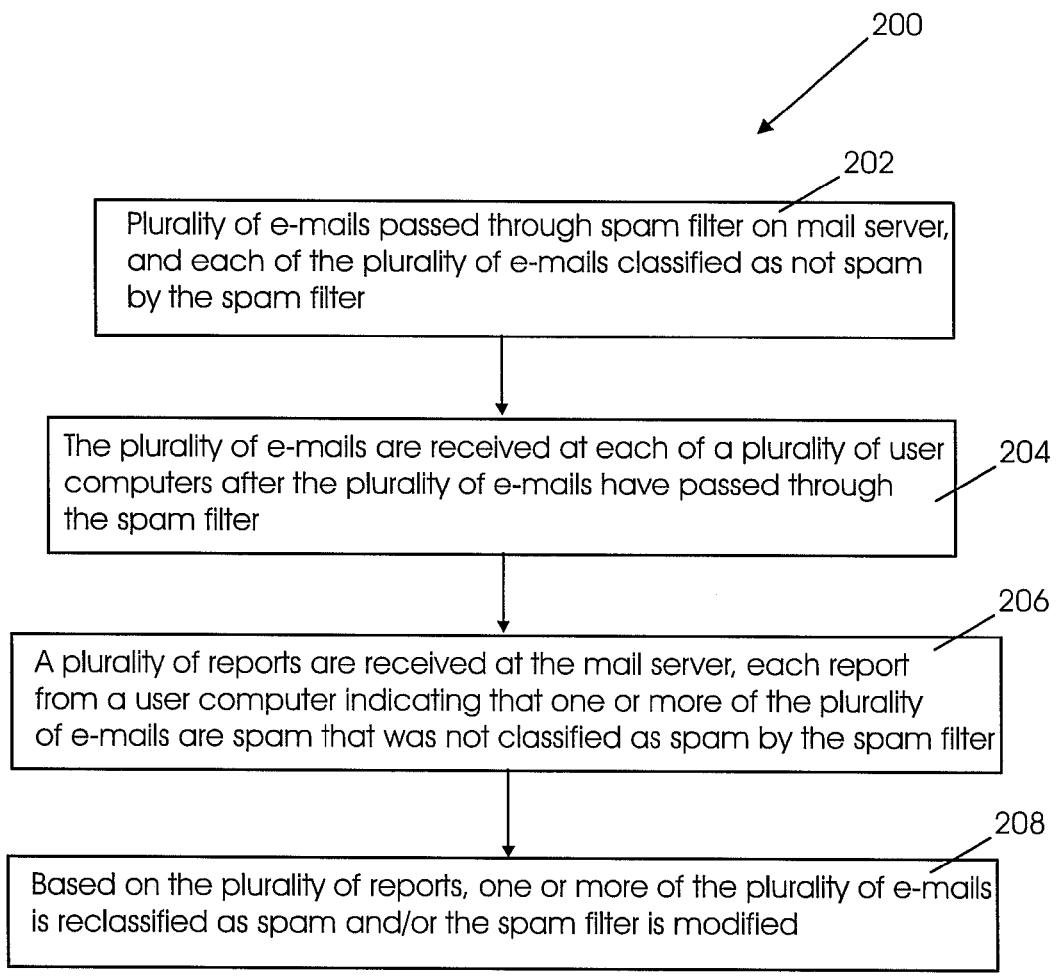
FIG. 2 shows a flow chart of a method of reclassifying spam.

FIG. 2 shows a flow chart 200 of a method of an embodiment of the disclosed technology. At step 202 a plurality of e-mails are passed through a spam filter on a mail server, such as mail server 102 in FIG. 1. The mail server 102 may be a computer, such as a computer 500, as will be described with reference to FIG. 5. The spam filter may classify each of the plurality of e-mails as not spam and permit those emails that are not spam to pass the filter. The mail server may be a computer and the spam filter may be implemented by a computer processor and a computer memory of the mail server 102. At step 204, the plurality of e-mails are received at each of a plurality of user computers, such as the first user computer 106 and the second user computer 108 shown in FIG. 1, after the plurality of e-mails have passed through the spam filter of the mail server 102.

Users, such as an individual at the first user computer 106 and an individual at the second user computer 108, may believe that one or more of the plurality of e-mails are "missed spam", i.e. spam which has been passed through as not spam by the spam filter of the mail server 102. A user, such as a user at first user computer 106 or second user computer 108, may send a report in to the mail server 102 to indicate that one or more of the plurality of e-mails was "missed spam". At step 206 a plurality of reports may be received at the mail server 102, each report from a user computer, such as 106 and 108, indicating that one or more of the plurality of e-mails are spam that was not classified as spam by the spam filter. The plurality of reports may be stored in the missed spam reports database 606 of the mail server computer memory 600 shown in FIG. 6 of mail server 102 shown in FIG. 1.

On reception of a report of "missed spam" at step 206, the Internet Service Provider may log the submission including in one embodiment a "message-id", "originating-ip", and "recipient email address" in the missed spam reports database 606 of mail server computer memory 600 of the mail server 102. Duplicate or non-existent entries, based on message-id checking, are not logged into the missed spam reports database 606. Spammers, in general, have email accounts on ISPs or have compromised other user accounts and will attempt to poison the input of the missed spam reports database 606. The mail server 102, in one embodiment, checks the missed spam reports from the user computers against the message database 602, such as on the mail server computer memory 600 of the mail server 102. This will stop or reduce poisoning attempts and may identify spamming accounts or user accounts that have been compromised. This checking will also stop upset users from entering multiple missed spam reports or submissions. Old, stale entries are not added to the missed spam reports database 606 both because the value of these entries has diminished and to control storage needs.

Based on the plurality of reports submitted to the missed spam reports database 606, one or more of the plurality of e-mails is reclassified as spam by the mail server 102 and/or the spam filter of the mail server 102 is modified at step 208. The spam filter may be implemented by a computer processor and/or computer memory of the mail server 102. The spam filter may be modified so that if a new e-mail identical to or similar to the "missed spam" e-mail is received by the modified spam filter the new e-mail will be properly identified as spam.

An e-mail sender or IP address sender may have its reputation lowered or raised in an IP address sender reputation database 608 of the mail server computer memory 600 of mail server 102. For an IP address sender, a check may be done to determine whether the IP address has surpassed the threshold for blocking e-mails from that IP address. There is some need for bootstrapping to get this process started. If the threshold has been surpassed, the IP address is checked against a whitelist and if the IP is on the whitelist, in one embodiment it is not blocked. If the IP is not on the whitelist, in one embodiment of the disclosed technology it is immediately added to the blacklist, and then e-mails from that IP address will be automatically blocked. If an IP address is blacklisted, then an entry may be added to the users' raising the reputation for each user that submitted a reported missed spam entry for this IP address sender.

If an IP address is determined to be blacklisted by this process, a check is then made, by the mail server 102 in one embodiment, against the Message Database 602 to identify all messages that have been recently sent by this IP address and are still residing in the post office Inboxes 610 on the mail server 102. Once the messages have been identified, their status is checked to determine whether they have been read or delivered. If they haven't been read or delivered, then the messages are moved from the user's post office Inbox from post office Inboxes 610 on the mailer server 102 to the user's post office spam folder of post office spam folders 612 of mail server computer memory 600. This greatly extends the ability by Internet Service Providers to filter spam after it has gotten past its blocking and filtering defenses, but before a user has read it. Spam attacks occur somewhat randomly throughout the day and are targeted at different users. Users read their mail at different times throughout the day, but in general, they only read it a couple of times each day. With restrictive thresholds, blocks initiated as a result of missed spam reporting are timely. As a result, some users will report missed spam which causes an IP to be blacklisted, which in turn causes all missed spam from the attack to be filtered from other user's mailboxes before they have had a chance to read it. The impact of the current and future attacks will be mitigated and will improve the overall effectiveness of the ISPs spam mitigation defenses.

A button, field, or toolbar having a designation or indication of the words "missed spam" may be provided in each of the e-mails or e-mail messages that are sent to the user, and such button, field or toolbar may be displayed on a computer monitor of a user computer, such as computer 106. In one embodiment of the disclosed technology a user can click on the "missed spam" button or field using a computer mouse or a computer touch screen, in order to report missed spam. The processing for the "missed spam" field, button, or toolbar may be provided through a user or client computer application or help program on a user computer, such as first user computer 106.

Figure 3:
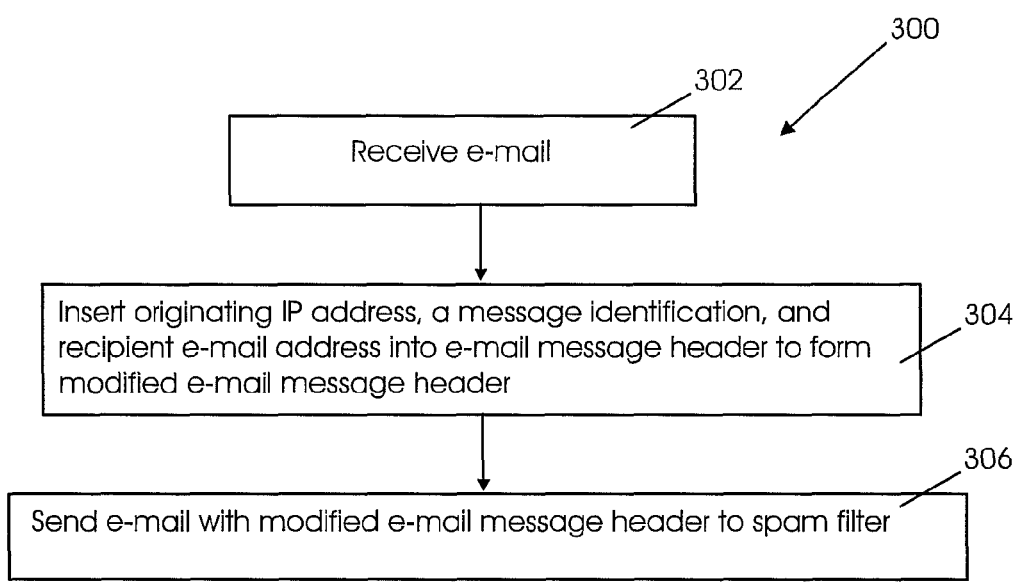
FIG. 3 shows a flow chart of a method of inserting various information into an e-mail message header.

FIG. 3 shows a flow chart 300 of a method of inserting various information into an e-mail message header in accordance with one aspect of the disclosed technology. The various information may be inserted into an e-mail message in response to the reception of an e-mail message at a mail server 102 or in response to a user clicking on a button, field or toolbar on a user computer, such as user computer 106, having a designation of "missed spam". In the prior art, e-mails typically have a message header, which is located at the top of the message before the message content. The prior art e-mail message header contains routing information of the mail systems the e-mail message transverses, as well as, some address and message information. However, message headers in the prior art do not include an originating IP address, message identification, or recipient e-mail address for the particular e-mail message or missed spam reports in accordance with the disclosed technology of the present application.

At step 302 of the method shown in FIG. 3, an e-mail or e-mail message is received, such as at mail server 102. An originating IP address for the e-mail message, a message identification, and a recipient e-mail address is inserted into the e-mail message header at step 304. The originating IP address, message identification, and recipient e-mail address could be inserted automatically at the mail server 102. In one embodiment of the disclosed technology, the originating IP address is obtained from the TCP/IP (Transmission Control Protocol/Internet Protocol) connection during SMTP (Simple Mail Transfer Protocol) session establishment. The message identification is a unique identifier for each specific message that is assigned by mail server 102. The recipient e-mail address is supplied by the originating mail system as the address to be the recipient of this email message. At step 306, the e-mail with modified e-mail message header is sent to the spam filter, such as the spam filter of the mail server 102, which may be used in the method shown in FIG. 2. The e-mail message prior to modification of the message header or after the modification of the message header may be stored in computer memory of the mail server 102.

At step 308 of the method shown in FIG. 3, a user clicked on a button, field or toolbar on a user computer, such as user computer 106, designating the email as "missed spam". The recipient e-mail address, in one embodiment of the disclosed technology, is obtained from login credentials of the sender of the missed spam report who is authenticated and just submitted the "missed spam report". The authenticated recipient e-mail address is then inserted into the header of the missed spam report, which already contains the originating IP address and the message identification at step 310 at the mail server 102. At step 312, the e-mail with modified missed spam report header is sent to update the mail server computer memory 600 in FIG. 6 of the mail server 102. The missed spam report prior to modification of the message header or after the modification of the header may be stored in computer memory 600 of the mail server 102.

In the prior art, when e-mail messages arrive at a mail server, the e-mail messages themselves normally already have an originating IP address in a message header in message routing information for the e-mail message. However, this originating IP address cannot be trusted, because spammers may have, and do, modify message headers of their spam e-mail messages. Therefore, in accordance with an embodiment of the disclosed technology, the field already provided with an originating IP address in the message header is not used. Instead, in at least one embodiment of the disclosed technology the originating IP address for a TCP/IP connection that is used to establish an SMTP session is used. In one embodiment of the disclosed technology, this TCP originating IP address is inserted as a separate field in a message header for the particular e-mail message.

When a member sends a "missed spam report" in, it may be poisoned by a spammer, i.e. it may be a bogus missed spam report. To determine if the missed spam report is bogus or poisoned, the mail server, such as mail server 102, may examine who is sending the report by looking at login credentials of the missed spam report sender who in one embodiment is authenticated and just submitted the "missed spam report". Additionally, instead of using the recipient email address in the message header, one embodiment of the disclosed technology may include inserting an authenticated recipient e-mail address into the "missed spam report" during transport from the reporter to the mail server, such as mail server 102. The mail server 102 may extract the originating IP address (that was inserted earlier in the e-mail which is now being identified as "missed spam"). The inserted originating IP address for the allegedly missed spam, should be in the message header of the allegedly missed spam e-mail, unless it was deleted or changed by spammers. In some cases there may legitimately be multiple originating IP addresses, such as possibly when one e-mail is forwarded to another address. In accordance with an embodiment of the present invention, the unique message identification (which was added to the e-mail message) is extracted and used to map to the original e-mail message that was processed by the mail server 102 through its spam filter. However, it is possible that a spammer may have figured out how the uniquely assigned message identifications are determined, so in one embodiment the mail server 102 is programmed to check the unique message identification along with the inserted originating IP address, and inserted recipient address against values stored in a Message database, such as message database 602, shown in FIG. 6.

At step 302 of the method shown in FIG. 3, an e-mail or e-mail message is received, such as at mail server 102 or at user computer 106 of FIG. 1. An originating IP address for the e-mail message, a message identification, and a recipient e-mail address is inserted into the e-mail message header at step 304. The originating IP address, message identification, and recipient e-mail address could be inserted automatically at the mail server 102, or could be inserted in response to a user clicking on a button, field, or toolbar designated "missed spam" on a user computer, such as 106. At step 306, the e-mail with modified e-mail message header is sent to the spam filter, such as the spam filter of the mail server 102, which may be used in the method shown in FIG. 2. The e-mail message prior to modification of the message header may be stored in computer memory of the mail server 102 or the user or client computers 106 and 108 and the e-mail message with the modified message header may also be stored in computer memory of the mail server 102 or the user or client computers 106 and 108.

Figure 4:
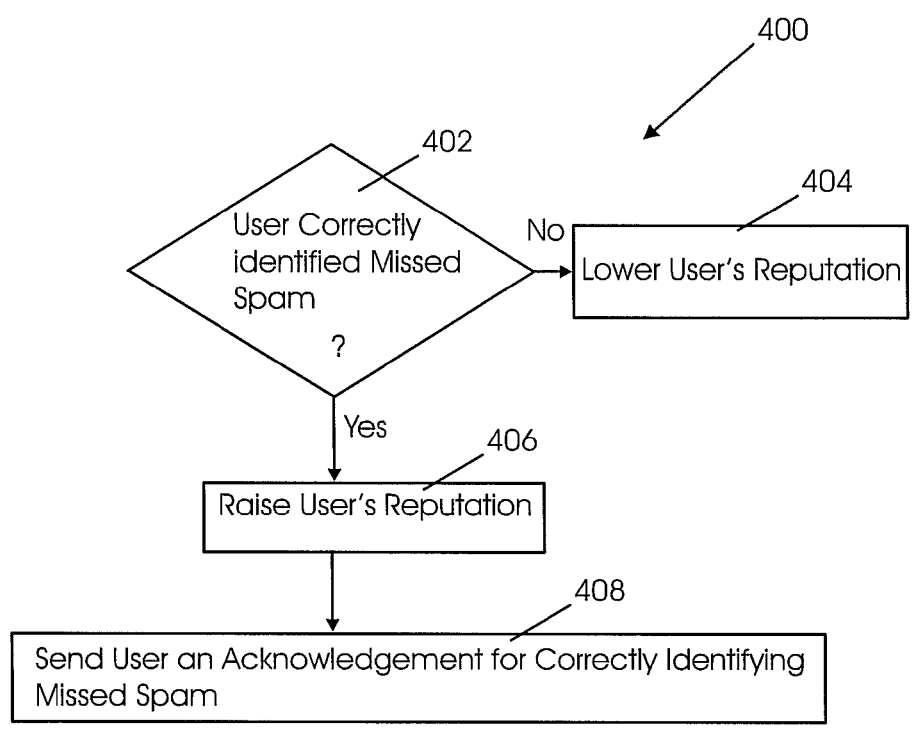
FIG. 4 shows a flow chart of a method of raising or lowering a user's reputation based on correctly or incorrectly identified spam.

FIG. 4 shows a flow chart of a method of raising or lowering a user's reputation based on correctly or incorrectly identified missed spam in accordance with an aspect of the disclosed technology. At step 402 the mail server 102 determines whether a user, such as first user computer 106, correctly identified missed spam. If the answer is no, then the user's reputation is lowered at step 404, such as by making an appropriate entry into the users' reputation database 604 in computer memory 600 shown in FIG. 6 of the mail server 102 shown in FIG. 1. If the answer if yes, then the user's reputation is raised, such as by making an appropriate entry into a users' reputation database 604 in computer memory 600 of the mail server 102. If the user has correctly identified missed spam, then the mail server 102 may send the user, such as the user computer 106, an acknowledgement at step 408. The acknowledgement may be a message which thanks the user for the assistance in identifying spam. For the ISP to keep its customers satisfied, it is important that the ISP, such as mail server 102, respond back to the user computer, such as 106, that the ISP heard the user's complaint, are doing something to improve the ISP's defenses, and acknowledge that the mitigation improvements are as a direct result of that user's input.

Upon reception of a missed spam report at mail server 102 from a user, entries or data concerning the users' reputation, which is contained in the users' reputation database 604, is checked. If the user has no reputation (i.e. not data concerning reputation), insufficient reputation (not enough data) or a bad reputation (data indicating a bad reputation), an entry may not be added to the IP address sender reputation database 608 in computer memory 600 of the mail server 102. If the user correctly identified the missed spam, then the user's reputation is raised by appropriate data entry into the user's reputation database 604 and then subsequent missed spam reports may begin to be used to lower or raise the IP address sender's reputation by appropriate data entry in IP address sender reputation database 608.

Figure 5:
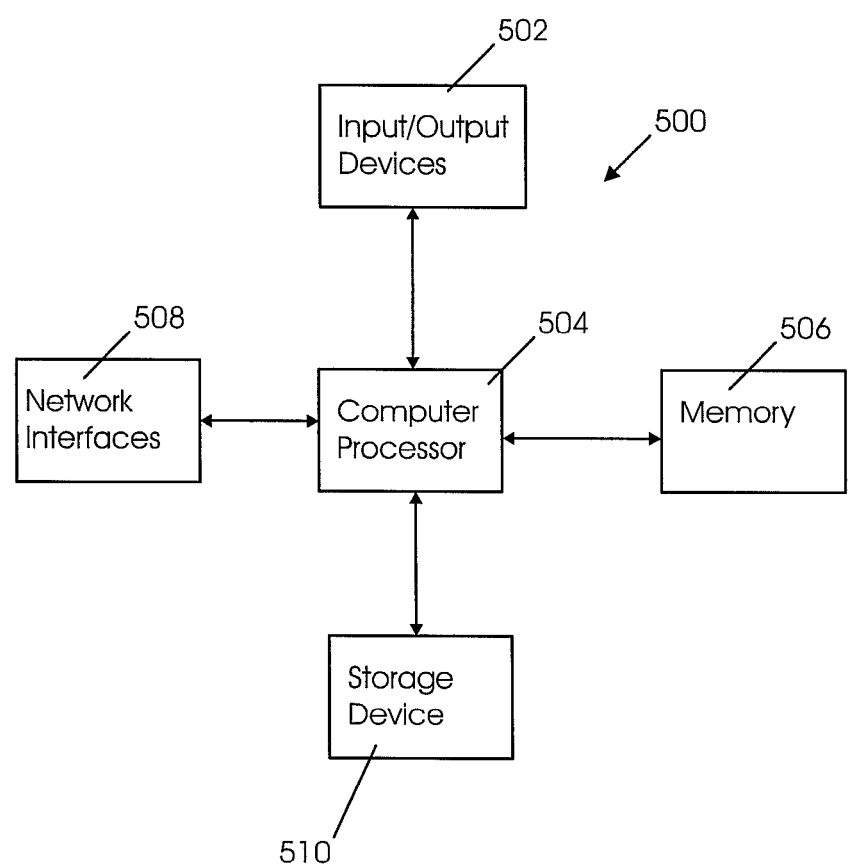
FIG. 5 shows a high level block diagram of a computer.

A high-level block diagram of a computer 500 that may be used in practicing the disclosed technology is illustrated in FIG. 5. Each of the mail server 102, the first user computer 106, and the second user computer 108 may be a computer similar to or identical to the computer 500. Computer 500 contains a processor 504, which controls the overall operation of the computer 500 by executing computer program instructions, which define such operation. The computer program instructions may be stored in a storage device 510 or other computer readable medium (e.g., magnetic disk, CD ROM, etc.), and loaded into a memory 506 when execution of the computer program instructions is desired. Thus, the method steps of FIGS. 2-4 can be defined by the computer program instructions stored in the memory 506 and/or storage device 510 and controlled by the processor 504 executing the computer program instructions. For example, the computer program instructions can be implemented as computer executable code programmed by one skilled in the art to perform an algorithm defined by the method steps of FIGS. 2-4. Accordingly, by executing the computer program instructions, the processor 504 executes an algorithm defined by the method steps of FIGS. 2-4. The computer 500 also includes one or more network interfaces 508 for communicating with other devices via a network. The computer 500 also includes input/output devices 502 that enable user interaction with the computer 500 (e.g., display, keyboard, mouse, speakers, buttons, etc). One skilled in the art will recognize that an implementation of an actual computer could contain other components as well, and that FIG. 5 is a high level representation of some of the components of such a computer for illustrative purposes.

Users generally have a good idea of whether an email message they receive in their mailbox is spam or a legitimate email. In addition, users want to tell their e-mail provider, ISP, that the ISP missed this spam message. One or more embodiments of the disclosed technology provide an easy way to facilitate communication from a user's email client or user computer, such as user computer 106, back to the ISP or mail server, such as mail server 102, that a spam message was missed. This collaborative input may be used as the means to determine the reputation of the mail system or sending IP address and whether a particular sending IP address should be added to a "blacklist", i.e. a list of IP addresses from which communications or connections will not be accepted.

One or more embodiments of the disclosed technology can be used in conjunction with current spam blocking and filtering processes. For example, a "whitelist", as known in the prior art, can be used. When an originating e-mail system attempts to transmit e-mail to a destination mail system, the originating IP address may be first checked against a "whitelist". The "whitelist" includes IP addresses from which connections are allowed, but e-mail messages are still subject to a spam filter. The e-mail can also be checked against a "blacklist" from which no communications or connections are accepted.

If a connection is accepted from a sender or IP address, instead of just passing the e-mail message to a spam filtering process, the originating IP address ("Originating IP") may be inserted in an existing message header of the e-mail (for example: X-Originating-IP: [111.22.333.44]), a message identification ("Message-id") is also inserted in the message header, and an entry may be logged in the message database 602 in computer memory 600 of the mail server 102, including the "Message-Id", "Originating-IP", and "Recipient e-mail address". The e-mail message may be passed to the spam filtering process as shown in step 202 in FIG. 2 and if determined not to be spam, it may be deposited in the recipient's post office Inbox of post office inboxes 610 on the mail server 102, with status of unread or undelivered.

The user then either reads the message using an online email client computer or user computer, such as user computer 106, or requests delivery of the message to their personal computer (PC) email client, such as user computer 106. The message status is then changed to read or delivered.

In one embodiment of the disclosed technology, the ISP, such as mail server 102, will get input or reports of "missed spam" from tens of millions of independent users on their determinations of tens of millions of spam messages every day. This is very valuable in identifying spam that is missed by current defenses and in identifying the sources of the spam attacks. Spammers can test their spam attacks against filtering rules that the ISP use in order to improve the effectiveness of their spam attack, but spammers can't test them against tens of millions of user's visual, non-biased, ever changing, subjective determinations.

As with all social, collaborative efforts it is important to sustain input. Spammers will most likely continue to send spam, ISPs blocking and filtering efforts will continue to allow spam to be delivered into user's mailboxes, and users will complain or report missed spam. In order to help sustain user input, the ISP may include results and thanks for this collaborative effort in their newsletters and also provide, as part of the reported missed spam submissions, real-time statistics on how many successful missed spam submissions were sent so far today, and how many total spam messages were filtered as a direct result of their input. Recognizing the efforts of the users, individually or as a whole, will help sustain this process.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
   receiving, by a mail server, an electronic mail associated with multiple user accounts;
   classifying, by the mail server, the electronic mail as not spam in response to a spam filter;
   sending, by the mail server, the electronic mail to addresses associated with the multiple user accounts in response to the classifying of the electronic mail as the not spam;

receiving, by the mail server, reports associated with the multiple user accounts, the reports indicating the electronic mail is missed spam by the spam filter;

determining, by the mail server, inboxes associated with the multiple user accounts to which the missed spam has not been delivered;

moving, by the mail server, the missed spam from the inboxes to spam folders associated with the multiple user accounts in response to the reports from the multiple user accounts; and raising, by the mail server, reputations associated with the multiple user accounts in response to the missed spam.

2. The method of claim 1, further comprising determining a bad reputation associated with a sender of the electronic mail.

3. The method of claim 1, further comprising associating the electronic mail to the inboxes in response to the classifying of the not spam by the spam filter.

4. The method of claim 1, further comprising sending a message that provides information concerning the missed spam.

5. The method of claim 1, further comprising:
inserting an originating internet protocol address, a recipient email address, and a message identification in a message header associated with the electronic mail; and
storing the message header associated with the electronic mail into a message database.

6. The method of claim 1, further comprising lowering a reputation associated with a sender associated with the electronic mail.

7. The method of claim 1, further comprising:
adding an internet protocol address associated with a sender of the missed spam to a blacklist;
identifying all emails associated with the internet protocol address associated with the sender of the missed spam;
checking a status of the emails to determine whether the emails have been read; and
moving unread ones of the emails to the spam folders.

8. An apparatus, comprising:
a processor; and
a memory device, the memory device storing computer program instructions, the computer program instructions when executed cause the processor to perform operations, the operations comprising:
sending an electronic mail sent from a mail server to a user computer associated with a user account, the electronic mail having an initial classification as not spam by the mail server executing a spam filter;
receiving a report from the user computer, the report indicating the electronic mail is missed spam after the initial classification as the not spam by the mail server executing the spam filter;
adding an entry to a missed spam database, the missed spam database logging the missed spam reported by user accounts, the entry electronically associating an originating address associated with the missed spam to a recipient address associated with the user account;
reclassifying the electronic mail as spam in response to the report from the user computer;
identifying other electronic emails stored by the mail server from the originating address;
determining unread ones of the other electronic emails stored by the mail server that have not been read;
moving the unread ones of the other electronic emails to spam folders stored by the mail server; and
raising a reputation associated with the user computer in response to the report indicating the electronic mail is incorrectly classified the missed spam;
wherein the unread ones of the other electronic emails from the originating address are filtered after the initial classification as the not spam by the mail server executing the spam filter.

9. The apparatus of claim 8, wherein the operations further comprise determining a bad reputation associated with a sender associated with the electronic mail.

10. The apparatus of claim 8, wherein the operations further comprise moving the missed spam to a spam folder.

11. The apparatus of claim 10, wherein the operations further comprise sending a message to the user computer, the message providing information concerning the reclassifying of the electronic mail as the spam.

12. The apparatus of claim 8, wherein the operations further comprise:
inserting the originating address, a recipient email address, and a message identification in a message header associated with the electronic mail; and
storing the message header associated with the entry in the missed spam database.

13. The apparatus of claim 8, wherein the operations further comprise lowering a reputation associated with a sender associated with the electronic mail.

14. A computer storage device storing computer program instructions which, when executed by a processor, cause the processor to perform operations, the operations comprising:
sending an electronic mail sent from a mail server to a user computer associated with a user account, the electronic mail having an initial classification as not spam by the mail server executing a spam filter;
receiving a report from the user computer, the report indicating the electronic mail is missed spam after the electronic mail was classified as the not spam by the mail server executing the spam filter;
adding an entry to a missed spam database, the missed spam database logging the missed spam reported by user accounts, the entry electronically associating an originating address associated with the missed spam to a recipient address associated with the user account;
reclassifying the electronic mail as spam in response to the report from the user computer;
identifying other electronic emails stored by the mail server from the originating address;
determining unread ones of the other electronic emails stored by the mail server that have not been read;
moving the unread ones of the other electronic emails to spam folders stored by the mail server; and
raising a reputation associated with the user computer in response to the report indicating the electronic mail is incorrectly classified the missed spam;
wherein the unread ones of the other electronic emails from the originating address are twice filtered by the mail server.

15. The computer storage device of claim 14, wherein the operations further comprise determining a bad reputation associated with a sender of the electronic mail.

16. The computer storage device of claim 14, wherein the operations further comprise moving the missed spam to a spam folder.

17. The computer storage device of claim 16, wherein the operations further comprise sending a message to the user computer providing information concerning the reclassifying of the electronic mail as the spam.

18. The computer storage device of claim 14, wherein the operations further comprise:
   inserting the originating address, a recipient email address, and a message identification in a message header associated with the electronic mail; and
   storing the message header associated with the entry in the missed spam database.

19. The computer storage device of claim 14, wherein the operations further comprise lowering a reputation associated with a sender associated with the electronic mail.

\* \* \* \* \*